Dec. 31, 1968 YOSHINARI MITA 3,418,927

HIGH SPEED INFORMATION RECORDING AND DUPLICATING APPARATUS
EMPLOYING A STENCIL MASTER DOCUMENT

Filed July 28, 1967

INVENTOR.
YOSHINARI MITA

BY

OSTROLENK, FABER, GERB & SOFFEN
ATTORNEYS

United States Patent Office 3,418,927

Patented Dec. 31, 1968

3,418,927

HIGH SPEED INFORMATION RECORDING AND DUPLICATING APPARATUS EMPLOYING A STENCIL MASTER DOCUMENT

Yoshinari Mita, Tokyo, Japan, assignor to Nippon Electric Company Limited, Tokyo, Japan Filed July 28, 1967, Ser. No. 656,792
Claims priority, application Japan, July 30, 1966, 41/49,965
6 Claims. (Cl. 101—90)

ABSTRACT OF THE DISCLOSURE

The invention is broadly comprised of high speed electronic recording means for forming characters, symbols and the like upon a document in accordance with output information received from a computer. Electronic recording means more closely approaches computer operating speeds than mechanical recording devices. The recording means is preferably of the electric discharge puncture type which forms a character or other symbol in the document at a predetermined location in accordance with a computer control.

Figure 1:
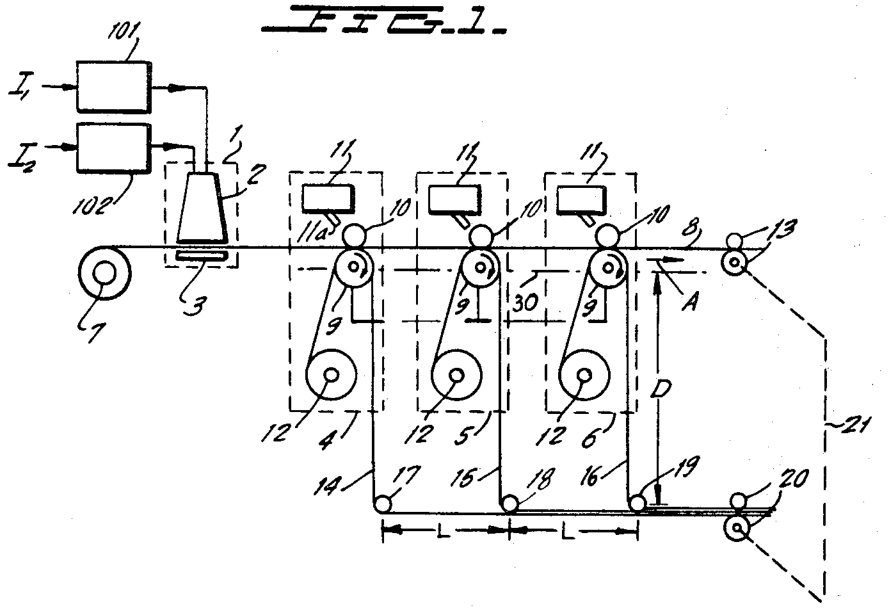

After the characters have been formed the document is linearly moved in a predetermined direction. Duplicate copies of the document are formed by providing a number of printing stations (equal in number to the amount of copies desired) each of which has an inking station arranged at spaced intervals along the path of movement of the master document. The document feed assembly is provided at each printing station for feeding a document at the same rate of speed as the master document and beneath the master document so as to cooperate with printing means provided above the master document for printing.

The master document is fed out between a pair of outfeed rollers while the duplicate documents are fed out at a second station between a second pair of feed rollers and are arranged about guiding rollers associated with each printing station such that the location of a particular character or word for each of the duplicate documents is exactly in alignment at the output station, at which point the duplicates are all fed out one upon the other.

The instant invention relates to computer printing devices and more particularly to high speed printing means of the electronic discharge puncture type which more closely approaches computer operating speeds for forming characters on a master document and a plurality of duplicate printing stations equal in number to the number of duplicates desired for forming duplicate copies of the master document wherein identical lines of print of the duplicates arrive at the feedout station in simultaneous fashion.

In high speed computer systems having printout capabilities it has been conventional to employ line printers which print out lines of characters at high speeds as the output information becomes available from the computer. The development of such high speed printers has been so rapid that the handling speeds of such printers have nearly reached the limits of mechanical design. In spite of this, the handling and operating speeds of electronic computers and the like have been increasing at a much faster rate so as to necessitate the use of printing devices capable of still higher speeds.

Insofar as mechanical printers are concerned such devices generate a significant amount of noise during the printing operation and therefore such printing devices which may typically be employed with business machines, for example, require operation with significantly less noise. The obvious alternative is to provide a printer of the electronic recording type which has been found to yield printing speeds of as much as ten times that of mechanical printers. In addition thereto, printers of the electronic type are quite superior to mechanical printers in that there is a significant reduction in noise level during operation.

However, since electronic recording systems lack the capability of providing copies, which capability is possessed by conventional mechanical printers and since such a capability becomes important for business machine use, the use of electronic printing systems has been limited to special applications in cases where no copies are required and have therefore not been introduced into general and widespread use due to its practical limitations.

It is therefore one primary object of the instant invention to provide a recording apparatus which is free from all of the above disadvantages, which operates at a significantly reduced noise level and which has the capability of providing a plurality of copies of the information fed out from information handling equipment such as, for example, electronic computers.

The instant invention provides a high speed information recording system for producing a plurality of copies and is comprised of an electronic recording means of the electric discharge puncture type which is operated by a pattern signal converting circuit responsive to information signals from information handling equipment such as an electronic computer. The pattern signal converting circuit converts the information signals into pattern signals while a positioning circuit responsive to position signals from the information handling equipment operates the recording device to accurately position a particular character or other symbol at a predetermined location.

The recording device, under control of the pattern signal converting circuit and the positioning circuit, generates predetermined discharge voltages at those positions conforming to the pattern signals and at a location designated by the positioning circuitry. The electric discharge puncture type recording mechanism discharges the discharge voltages between the recording mechanism and an electrode plate between which two elements the document passes. The result of the voltage discharge operation is the formation of the appropriate characters or symbols in the document which then is fed out in a linear manner to suitable takeup rollers.

The copies are produced by providing printing mechanisms equal in number to the copies desired which are arranged at spaced intervals in the region between the recording mechanism and the take-up rollers. Each printing mechanism is comprised of a pair of printing rollers, an ink feeding mechanism for feeding one of the printing rollers with ink, a printing paper storage mechanism and suitable means for guiding the respective documents to a second assembly of takeup rollers. Each printing mechanism prints the pattern information on to an associated sheet provided from its printing paper storage means to make a copy of each line or other arrangement of the master document. The printing paper drive rollers and the master document drive rollers are interlocked to travel at the same linear speed. Each printing mechanism unit is arranged so that the distance between its printer roller assembly about its guide roller to the second pair of takeup rollers, when considered with the time at which a particular line is printed, is so selected as to cause each line of characters reproduced to be exactly lined up at the takeup station with the identical line printed by all other printing mechanism units so as to greatly facilitate separation, distribution and use of such copies.

It is therefore one object of the instant invention to provide a novel printing system for use with high speed computers and the like which is capable of producing a plurality of copies of the information emitted from the computer substantially at the same time as the master copy is produced.

Another object of the instant invention is to provide a novel electronic printing mechanism for use with computers and the like comprising electronic printing means of the electric discharge puncture type for forming characters, symbols and the like on a master document and further comprising a plurality of printing stations arranged at spaced intervals beyond the electric discharge puncture type assembly for producing a plurality of copies of the master document wherein the identical line of type of each copy arrives at a takeup station at the identical time to facilitate subsequent utilization of the master document and the copies formed therefrom.

These and other objects of the instant invention will become apparent when reading the accompanying description and drawings in which:

FIGURE 1 is a simplified block diagram showing one embodiment of a high speed information recording apparatus designed in accordance with the principles of the instant invention.

Figure 1A:
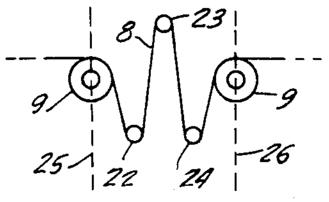

FIGURE 1*a* is a schematic diagram of one arrangement which may be used in FIGURE 1.

Figure 2A:
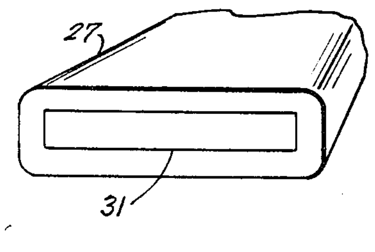
Figure 2:
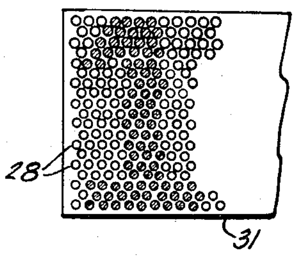

FIGURE 2 is a plan view showing a portion of the front face of the assembly of FIGURE 2*a*.

FIGURE 2*a* is a perspective view showing the forward portion of a cathode ray tube employed in the recording apparatus of the instant invention.

Figure 3:
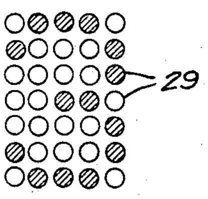

FIGURE 3 is a plan view showing the pin electrode arrangement of another recorder device which may be employed in the system of FIGURE 1.

FIGURE 1 shows one preferred embodiment of the instant invention in an application wherein a master document and three copies thereof may be produced. The system of FIGURE 1 includes an electric discharge puncture type recording mechanism 1 which is comprised of a recorder 2 capable of generating charging voltages at a plurality of points arranged in a cluster of a predetermined configuration which charging voltages may be positioned at any desired predetermined location on a sheet of master paper 8 in accordance with input control signals. An electrode plate 3 is positioned in close proximity to the front face of recorder 2 with the master document 8 passing therebetween in the manner shown.

A pattern signal converting circuit 101 receives an information signal $I_1$ generated from an information handling apparatus such as an electronic computer. The converting circuit 101 converts the input signal to generate a corresponding signal coupled to recorder 2 which initiates the discharging operation. A positioning circuit 102 receives a position signal $I_2$ from the information handling source (not shown) which signal operates the positioning circuit to control recorder 2 to accurately position a pattern signal which may, for example, be characters, numerals and so forth.

The master document 8 is fed in either a continuous or an intermittent manner, in a direction shown by arrow A, under control of the master document driving rollers 13 which are rotatably mounted rollers, at least one of which is driven by a suitable driving source such as, for example, a motor (not shown). The initial printing mechanism section is further comprised of a master document supply reel 7 which feeds the document through the recording mechanism to the takeup or master document paper driving rollers 13.

The duplicate printing section, as shown in the preferred embodiment of FIGURE 1, is comprised of three printing mechanism units 4, 5 and 6 arranged at spaced intervals in the region between recorder 2 and rollers 13.

Each printing mechanism unit 4, 5 and 6 is comprised of a printing paper supply unit 12, a pair of cooperating printing rollers 9 and 10, an ink reservoir, or other suitable ink source 11, and an ink feed **11*a* for either continuously or intermittently replenishing printing roller 10 with ink. The horizontal distances between the centers of rollers 9 are all equal to a distance L for a reason to be more fully described. Each of the sheets of paper 14, 15 and 16 fed out from their associated supplies 12 are entrained around their printing rollers 9 and guided vertically downward so as to be partially entrained around an associated guide roller 17, 18 and 19, respectively, so as to be simultaneously fed out between a second pair of driving rollers 20. As can clearly be seen, documents 14 and 15 become overlapped at roller 18 and the overlapped documents 14 and 15 further become overlapped with document 16 at guide roller 19. The driving rollers 13 and 20 are mechanically linked, as shown by dotted line 21**, to indicate that they are both driven at the same speed by the same driving power source regardless of whether the rollers are driven either intermittently or continuously.

Data, in the form of either symbols, characters or the like, is recorded on respective positions of the master document 8, usually on a line-by-line basis, which positions are determined by positioning control circuit 102 in accordance with a position signal $I_2$ received from a computer, for example. The actual recording apparatus and method which may employed will be described subsequently.

Once the characters or other symbols have been recorded or otherwise formed in the master document 8 it is fed in the direction shown by arrow A in either a continuous or an intermittent fashion so that ultimately the characters thus formed will pass between the printing rollers 9 and 10 of the first copying station mechanism 4. The ink or other suitable fluid is supplied to printing roller 10 which feeds the ink through the characters formed so as to print a record of the characters upon one surface of document or paper 14 which is positioned immediately beneath master document 8 and which together with master document 8 is squeezed between rollers 9 and 10. The document 14 is then guided first in a downward vertical direction and then is guided in a horizontal direction about guide rollers 17 so as to be fed out through the second pair of drive rollers 20.

In a like fashion, the line of characters or other symbols of master document 8, after passing between the rollers 9 and 10 of printing station 4, continues to move toward the right at which time it passes between rollers 9 and 10 of printing station 5, which in the preferred embodiment is shown to be located a distance L from the first printing station 4. A similar printing operation occurs at this station upon one surface of document 15 which is partially entrained about guide roller 18, at which point it joins document 14 to be fed between rollers 20.

Finally, the line of characters on master document 8 travels the second incremental distance L, at which time it passes between the print rollers 9 and 10 of printing station 6, causing the same line of characters previously printed at stations 4 and 5 to be printed at station 6. This document 16 is also guided downwardly and around guide roller 19 where it joins documents 15 and 14 so that all three documents are fed in their stacked or overlapping fashion between the drive rollers 20 from which point they may be wound about about a takeup roller (not shown), cut into individual sheets, or utilized in any one of a variety of different ways. Whereas the embodiment of FIGURE 1 shows a system capable of producing a master document and three copies thereof, it should be understood that a greater or lesser number of copies, in addition to the master document, may be produced by providing fewer or more printing stations the same type as printing stations 4, 5 and 6.

In the preferred embodiment, shown in FIGURE 1, the three guide rollers 17–19 each being preferably of equal diameter, are spaced a distance D beneath the center lines of the print rollers 9, all of which are preferably of equal diameter and whose center lines are substantially coplanar lying in the plane designated by phantom line 30. Selection of these dimensions results in the three sheets 14–16 being drawn through drive rollers 20 to be so aligned that an identical line of characters printed on each of the three sheets will be in exact alignment, i.e., will be directly above one another in spite of the fact that each copy has been produced after a time lag equal to a distance L divided by the greatest speed of the moving document 8. Between each station the practical effect which occurs at the output station of the drive rollers 20 is that the three copies were printed simultaneously with corresponding lines of characters on each of the three documents being substantially exactly in alignment with one another. The exact alignment of corresponding lines of characters at the location 20 results in the fact that the same period of time in which it takes the first line of characters printed at station 4 to be printed and to travel vertically downward toward guide roller 17 the master document 8 is traveling at the same rate of speed and travels an identical distance to station 5. Thus, from the vertical relationship between the identical lines of print, the line of characters printed at station 4 lies at distance L below the characters between the print rollers 9 and 10 of station 5. However, during the time in which it takes the line of characters printed at station 5 to reach its associated guide roller 18 the corresponding lines of characters printed at station 4 must reach its guide roller 17 and then travel horizontally to reach guide roller 18 so that these corresponding lines of print will arrive at guide roller 18 at substantially the identical point in time so that they will be directly in alignment with one another. The same relationship holds with respect to the printing station 6 and stations 4 and 5 so that the corresponding line of print on each of the documents 14, 15 and 16 will arrive at guide roller 19 at substantially the identical point in time. Obviously, the same arrangement can be carried out if more than three copies are desired, simply by adding additional printing stations and providing the appropriate distance relationships among the various stations. Obviously, the driving roller pairs 13 and 20 may be shifted further to the right to provide the necessary space for additional printing stations.

It should be noted that while the dimension D between print roller 9 and guide rollers 17, 18 and 19 of the stations 4–6, respectively, were recited as being equal and further that the dimension L between the centers of rollers 9 for each of the stations 4–6 were recited as being equal, this description was offered for the purposes of simplicity in expediting an understanding of the invention and that maintenance of these specific distances are not necessary to provide successful operation in the same manner as was previously described. The main requirement, however, is to provide the following dimensional relationships:

The distance from the printing location of rollers 9 and 10 for the first printing station 4 to the driving rollers 20 measured along the path including guide roller 17 (i.e., not the straight line distance between rollers 9 and 20) should be equal to the distance between print rollers 9 and 10 of station 4 and drive roller 20 measured along the line between print rollers 9 and 10 of station 4 to print rollers 9 and 10 of station 5 down to guide roller 18 and hence to drive roller 20; which, in turn, should be equal to the distance measured from print rollers 9 and 10 of station 4 substantially in a straight line to print rollers 9 and 10 of station 6, then to guide roller 19.

Obviously, if additional printing stations are to be employed for the purpose of making more than three copies of the original document, the dimensional relationships would be substantially the same.

A variety of additional arrangements may be provided to yield the same result. For example, the distance L between the centers of rollers 9 or any two stations, may be increased by the use of additional guide rollers in the manner shown in FIGURE 1*a*. The distance L in the embodiment of FIGURE 1 actually represents the distance that the master document travels between the print rollers 9, 9 of the stations 4 and 5. This distance can be increased without increasing the actual straight line distance between the rollers 9, 9 through the use of additional guide rollers 22–24, for example. The guide rollers may be positioned in elongated slots (not shown) within supporting structures so as to adjust the overall distance measured along the master document 8 from the point of master document 8 which intersects with the vertical line 25 to the point of master document 8 which intersects with the vertical line 26. Thus, if desired, the printing stations can be moved closer to one another and yet the separated distance between the stations which may originally have been equal to L may be maintained through the use of the additional guide rollers 22–24 as shown.

Let it further be assumed that it becomes advantageous to move station 4 closer to station 5 while the positions between stations 5 and 6 remain fixed, as shown in FIGURE 1. The decrease in the dimension L may be compensated for by moving guide roller 17 vertically down, horizontally to the left, or diagonally downward and to the left, so as to provide additional travel distance to compensate for the shortened distance between stations 4 and 5 where the print rollers meet the line of characters on master document 8.

In addition to the above, additional guide rollers may be provided at some suitable location intermediate the drive roller pair 13 and drive roller pair 20 to cause the master document to be overlapped together with the copies so that the master document, as well as all copies, will be aligned with corresponding lines of characters being arranged immediately one above the other.

FIGURES 2*a* and 2 show the front portion of a cathode ray tube and a detailed view of a portion of the front face of the cathode ray tube, respectively, which device may be employed in a pattern information recorder of the instant invention. The electrode plate 31 of FIGURE 2 is imbedded in the front face of cathode ray tube 27, as shown in FIGURE 2*a*. The electrode plate 31 is comprised of a large number of pin electrodes 28 each having a diameter substantially within the range from a few microns up to a few tens of microns. All of the pin electrodes are bundled rather closely together while being electrically insulated from one another. For example, the region surrounding each pin may be of suitable insulating material so as to electrically isolate all pins from one another.

The electron beam of the cathode ray tube 27 is modulated by a pattern signal which may, for example, be of the type described in U.S. Patent No. 3,320,458, issued May 16, 1967, and assigned to the assignee of the instant invention. As described therein the electron beam is first caused to be deflected through a pattern mask to give the electron beam a shape corresponding to a character or other symbol. The beam is then returned to the cathode ray tube central axis and is further caused to be deflected so as to be positioned at a predetermined location at the face of the tube. Thus, the electron beam will strike a predetermined group of the pin electrodes causing charging voltages conforming to the pattern symbol to be given to the pin electrodes which the electron beam strikes. By discharging the charging voltages between the electrodes 28 and the electrode plate 3, it is possible to record on the master document 8 characters and/or symbols of a variety of configurations. As shown in FIGURE 2, for example, the charge condition of the pin electrodes resulting from a pattern signal corresponding to the decimal number 1 is indicated by those pin electrodes which are designated with cross-hatching.

As another modification, an electron beam may be caused to sweep the face of cathode ray tube 27 in a manner substantially identical to that in which an electron beam scans the face of a conventional TV receiver tube. By providing a modulating voltage selectively applied to the cathode ray tube structure (i.e., its electron gun) the beam, after a number of sweeps across the face of the tube may be caused to set up the charging voltages on the cross-hatched pin electrodes, shown in FIGURE 2. Such an arrangement would be useful in applications where printing speed is not quite as demanding as the case where the electron beam is shaped to form a character or other symbol and is caused to simultaneously strike all of the selected pin electrodes to form the desired character or symbol. The latter embodiment would require a greater length of time in which to form such a character on the face of the tube.

FIGURE 3 shows another example of a recorder which may be employed with the instant invention to form a character or symbol pattern. In this case, the pin electrodes 29 are arranged in an ordered matrix comprised of five columns and seven rows wherein all the electrodes are electrically insulated from one another. Electrical circuits are established with selected pin electrodes of the embodiment of FIGURE 3 which correspond to the pattern (i.e., of a character or other symbol) to be printed. Then, a voltage is applied either in series across each row or in parallel across all of the rows by applying a voltage (either sequentially or simultaneously) to the established circuits of a level suitable to produce the discharging operation. The applied voltages can perform the recording on the master document by discharge between the electrodes 29 and the electrode 3 to form the appropriate character or symbol in the document. FIGURE 3 shows those pin electrodes (which are cross-hatched) employed for the purpose of forming a pattern signal corresponding to the decimal number 3. In the embodiment of FIGURE 3 the pin electrodes have quite larger diameters and the spacing therebetween can be much greater than is the case with the embodiment of FIGURES 2*a* and 2. In addition thereto, the pin electrodes of either FIGURES 2 or 3 may be of any other shape such as square, rectangular, diamond shaped, hexagonal, and so forth.

It can be seen from the foregoing that the instant invention provides a novel arrangement for producing a readable document containing characters and/or symbols fed from a high speed computer wherein high speed printing is achieved through the use of an electronic recording means of the electric discharge puncture type and wherein a plurality of copies of the after document may be produced after only a very brief interval following the formation of a master document wherein the copies (and the master, if desired) are all fed out in overlapped or stacked fashion with corresponding lines of the copies all being in alignment.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A high speed information recording system for producing a plurality of copies of characters and/or symbols fed from a data processing unit such as electronic computers and the like, which copies are produced through the intermediary of an electric discharge puncture type recording document comprising:

master document supply means;

driving roller means arranged at a spaced distance from said supply means for feeding said master document away from said supply means and toward said drive roller means;

electronic recording means of the electric discharge puncture type for recording patterns in said document having the configurations of characters and other symbols representative of the information signals received from said computer, said electronic recording means being located near said supply means;

a plurality of printing mechanisms arranged at spaced intervals between said electronic recording means and said driving roller means;

each of said printing mechanisms being comprised of a pair of printing rollers, an ink feeding mechanism for feeding one of said printing rollers and printing paper storage means;

a second pair of driving roller means mechanically linked with said first pair of driving roller means to cause the pairs of driving roller means to operate substantially at the same speed;

each of said printing paper storage means being adapted to feed paper out so as to pass between the second pair of driving roller means which draws paper from each of said means which passes therebetween, away from their associated printing paper storage means;

a plurality of guide rollers each being located between its associated printing roller means and the second pair of driving roller means and being so positioned as to cause the distance which a particular line of characters travels from the print roller assembly of the first printing mechanism to the second pair of driving rollers to be equal to the distance between the print roller assembly of the first printing mechanism closest to said electronic recording means plus the distance from the print roller assembly of said next printing mechanism to said second driving roller assembly in order to cause corresponding lines of characters to be exactly in alignment at least by the time the document copies pass between the second pair of driving roller means.

2. The system of claim 1 wherein the master document and the copy document are caused to pass between the printing rollers in each of said printing mechanisms.

3. The system of claim 1 wherein said electronic recording means is comprised of electric discharge puncture type recording means positioned adjacent one surface of said master document and further comprising an electrode positioned adjacent the opposite surface of said document for discharging voltages developed by said recording means to form characters or other symbols in said master document representative of the information received from said electronic computer.

4. The system of claim 3 wherein said electronic recording means is further comprised of a pattern signal converting circuit for converting information signals representing a predetermined character or other symbol into a pattern signal;

positioning circuit means responsive to position signals received from said electronic computer for converting said position signals into signals employed by said electronic recording means for positioning the pattern signals at a predetermined location along said document.

5. Means for producing a plurality of copies of a master document being comprised of an elongated sheet fed between a supply and a takeup station wherein said master document has characters and/or other symbols formed therein by means of punctures in the document arranged in a predetermined pattern to represent a character or slmbol, the improvement comprising:

a plurality of printing mechanisms arranged at spaced intervals between said supply and takeup stations;

each of said printing mechanisms being comprised of a pair of printing rollers arranged to have the master document pass therebetween to cause a particular line of characters or other symbols to arrive at each pair of printing rollers at staggered times;

a supply reel for each of said printing mechanisms having an elongated sheet of paper passing between its associated pair of printing rollers together with said master document;

ink feeding means for each of said printing mechanisms for feeding one of said pair of rollers with ink causing a copy of the patterns in said master document to be reproduced in the sheet of each printing mechanism at staggered delay times;

a pair of driving rollers for receiving all of the elongated sheets from each of said printing mechanisms therebetween so as to drive said elongated sheets in a direction toward said driving roller means;

a plurality of guide roller means associated with each of said printing mechanisms and located between the pair of printing rollers of its associated printing mechanisms and said driving roller means for guiding its associated elongated sheet in its movement toward said driving roller means;

said printing mechanisms being so arranged that the distance between the pairs of printing rollers of adjacent printing mechanisms and the distance between a pair of printing rollers and its associated guide roller is selected so as to cause corresponding lines printed on said elongated sheets to be aligned one immediately above the other at least by the time they reach said driving roller means.

6. The system of claim 1 wherein said recording means is comprised of a cathode ray tube assembly having a large plurality of pin electrodes arranged along the tube face;

an electrode plate positioned in close proximity to the tube face of said cathode ray tube for discharging the charging voltages applied to said pin electrodes by the electron beam of the cathode ray tube means to form an electric discharge puncture pattern on said master document.

References Cited

UNITED STATES PATENTS

| | | | |
|---|---|---|---|
| 1,375,331 | 4/1921 | Smith ---------------- | 101—121 |
| 2,664,043 | 12/1953 | Dalton ------------- | 101—128.2 |
| 3,006,992 | 10/1961 | Nakagawa et al. ------ | 178—6.6 |
| 3,283,704 | 11/1966 | Dalton ------------- | 101—128.2 |

WILLIAM B. PENN, *Primary Examiner.*

U.S. Cl. X.R.

101—50, 113, 121, 129, 132